US008620265B1

(12) United States Patent  
Gailloux et al.

(10) Patent No.: US 8,620,265 B1  
(45) Date of Patent: Dec. 31, 2013

(54) HANDSET AWARENESS AND TRACKING OF SUBSCRIPTION PLAN

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 253 days.

(21) Appl. No.: 13/102,403

(22) Filed: May 6, 2011

(51) Int. Cl.
*H04M 11/00* (2006.01)
*H04M 15/00* (2006.01)
*H04M 15/28* (2006.01)

(52) U.S. Cl.
USPC . 455/407; 455/405; 379/114.01; 379/114.03; 379/130; 379/140

(58) Field of Classification Search
USPC ........... 455/405–408, 436–445, 552.1, 553.1; 379/114.01, 114.03, 114.16, 114.17, 379/130, 131, 140
See application file for complete search history.

(56) References Cited

U.S. PATENT DOCUMENTS

| | | | | |
|---|---|---|---|---|
| 6,125,173 | A * | 9/2000 | Jagadish et al. | 379/114.1 |
| 6,131,024 | A * | 10/2000 | Boltz | 455/405 |
| 6,148,191 | A * | 11/2000 | Kim | 455/407 |
| 6,356,628 | B1 * | 3/2002 | Burke et al. | 379/112.06 |
| 6,493,547 | B1 * | 12/2002 | Raith | 455/405 |
| 6,606,377 | B2 * | 8/2003 | Ruckart et al. | 379/121.02 |
| 6,970,692 | B2 * | 11/2005 | Tysor | 455/405 |
| 7,167,699 | B1 * | 1/2007 | Kretsinger | 455/405 |
| 7,280,818 | B2 * | 10/2007 | Clayton | 455/407 |
| 7,420,920 | B2 * | 9/2008 | True et al. | 370/235 |
| 7,463,726 | B2 * | 12/2008 | Jensen et al. | 379/114.02 |
| 7,761,081 | B2 * | 7/2010 | Shamanna | 455/405 |
| 7,761,087 | B2 * | 7/2010 | Kharia et al. | 455/414.1 |
| 7,983,712 | B2 * | 7/2011 | Mayer et al. | 455/553.1 |
| 8,346,212 | B2 * | 1/2013 | Breitzman et al. | 455/406 |
| 8,494,918 | B1 * | 7/2013 | Vinnitskiy | 705/26.4 |
| 2002/0022472 | A1 * | 2/2002 | Watler et al. | 455/405 |
| 2002/0054569 | A1 * | 5/2002 | Morikawa | 370/252 |
| 2002/0151293 | A1 * | 10/2002 | Tysor | 455/406 |
| 2003/0027554 | A1 * | 2/2003 | Haumont | 455/414 |
| 2004/0077337 | A1 * | 4/2004 | Vestergaard et al. | 455/414.1 |
| 2004/0203580 | A1 * | 10/2004 | Engelhart | 455/406 |
| 2004/0209595 | A1 * | 10/2004 | Bekanich | 455/405 |
| 2005/0054324 | A1 * | 3/2005 | Chmaytelli et al. | 455/405 |
| 2005/0105467 | A1 * | 5/2005 | True et al. | 370/235 |
| 2005/0105704 | A1 * | 5/2005 | Harrison et al. | 379/114.2 |
| 2005/0107065 | A1 * | 5/2005 | Bernhart | 455/405 |
| 2008/0182552 | A1 * | 7/2008 | Dinh et al. | 455/408 |
| 2010/0191612 | A1 * | 7/2010 | Raleigh | 705/26 |
| 2011/0300826 | A1 * | 12/2011 | Chang et al. | 455/405 |
| 2012/0276867 | A1 * | 11/2012 | McNamee et al. | 455/406 |

* cited by examiner

*Primary Examiner* — Matthews Sams

(57) ABSTRACT

A portable electronic device that promotes user awareness of approaching a usage limit is provided, comprising a processor, a memory, and an application. When executed by the processor, the application installs a file describing a subscription plan documenting availability of at least one of wireless voice and data services, the subscription plan comprising a usage limit. The application also records a first usage of a first unit of a first service provided under the plan and increments a count of units of usage of the first service during a first usage period based on the record of the first usage. The application also detects the count of units of usage reaching a first predetermined threshold wherein the threshold is less than the usage limit. The application also presents a first message, the message providing notification of the count of units of usage reaching the threshold.

8 Claims, 6 Drawing Sheets

HANDSET AWARENESS AND TRACKING OF SUBSCRIPTION PLAN

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications service providers sell mobile telephone service in two principal ways: the prepaid model where voice, text, and data communication services are paid for before use and added to a phone unit via an Internet account or in retail stores, or the postpaid contract model where bills are presented for payment after the service has been consumed. Users may purchase a basic prepaid or postpaid package and then add on services and functionality to create a subscription customized to the users' needs. With prepaid plans, purchased credit is used to pay for mobile phone services at the point the service is accessed or consumed. If there is no available credit then access to the requested service is denied by the service provider. Credit purchased for a prepaid mobile phone may have a time limit, for example ninety days from the date the last credit was added. Postpaid contract users are billed after the fact according to their use of mobile services at the end of each billing period. The customer's contract typically specifies a limit or allowance of minutes, text messages, etc., and the customer will be billed at a flat rate for any usage equal to or less than that allowance. Any usage above that limit incurs extra charges.

SUMMARY

In an embodiment, a portable electronic device that promotes user awareness of approaching a usage limit is provided, comprising a processor, a memory, and an application. When executed by the processor, the application installs a file in the memory that describes a subscription plan documenting availability of at least one of wireless voice and data services, the subscription plan comprising a usage limit. The application also records a first usage of a first unit of a first service provided under the subscription plan and increments a count of units of usage of the first service during a first usage period based on the record of the first usage. The application also detects the count of units of usage reaching a first predetermined threshold wherein the first predetermined threshold is less than the usage limit. The application also presents a first message, the first message providing notification of the count of units of usage reaching the first predetermined threshold.

In an embodiment, a processor-implemented method for promoting user awareness of approaching a usage limit is provided. The method comprises a portable electronic device installing a file received wirelessly wherein the file describes a subscription plan documenting availability of a first limited quantity of units of usage of a first wireless communication service and a second limited quantity of units of usage of a second wireless communication service available for consumption during a first time period. The method also comprises the portable electronic device maintaining a first count of consumption of units of the first wireless communication service during the first time period. The method also comprises the portable electronic device maintaining a second count of consumption of units of usage of the second wireless communication service during the first time period. The method also comprises the portable electronic device receiving an input initiating consumption of a unit of usage of the first wireless communication service wherein the usage comprises sending one of a first voice and a first data transmission. The method also comprises the portable electronic device determining that the first count of consumption of units has reached a first predetermined threshold wherein the first predetermined threshold is less than the first limited quantity and further determining that the second count of usage has not reached a second predetermined threshold wherein the second predetermined threshold is less than the second limited quantity. The method also comprises the portable electronic device presenting a first message, the first message providing notification that the first count of usage has reached the first predetermined threshold and suggesting that the first transmission instead be sent using the second wireless communication service.

In an embodiment, a processor-implemented method is provided. The method comprises a portable electronic device installing a first file wherein the first file is received from a provider of telecommunications services and wherein the first file describes a first subscription plan documenting a first wireless service. The method also comprises the portable electronic device receiving a second file from the provider of telecommunications services wherein the second file describes a second subscription plan and wherein the second subscription plan replaces the first subscription plan based on a selection made by a subscriber associated with the portable electronic device. The method also comprises the portable electronic device installing the second file wherein installation at least partially overwrites the first file and causes at least a second wireless service associated with the second subscription plan to become available.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
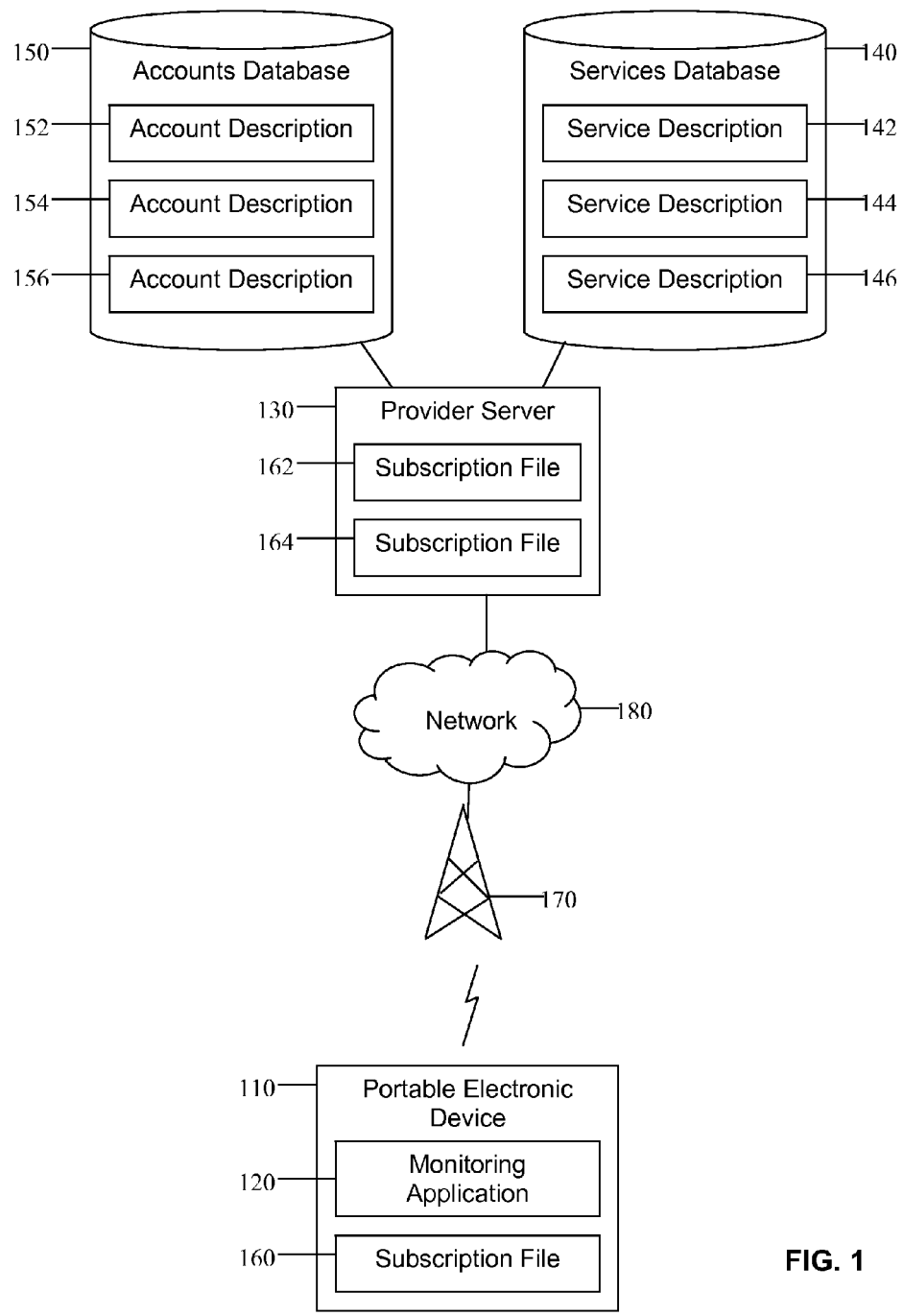
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure describes a system and methods providing an application executing on a portable electronic device that maintains awareness of a wireless services subscription agreement associated with the device. The system monitors usage of wireless services purchased under the subscription and provides alerts to the subscriber when usage of a wireless service approaches or reaches a paid limit, for example a usage limit. The system alerts subscribers when they may soon be reaching paid limits and therefore incurring overages above a base monthly or other subscription payment amount. The system suggests alternate services available under the subscription that may better suit the subscriber's needs, that more efficiently use paid services, and may result in the avoidance of overlimit charges. This may result in increased customer satisfaction and greater subscriber loyalty and retention. By moving subscriber interaction processing from components on a telecommunications service provider's network to the portable electronic device, the system provides a more seamless, local, and rapid interaction, further enhancing the customer experience.

The telecommunications service provider may determine that customer satisfaction and loyalty as well as subscriber retention are maintained or improved when subscribers have access to current, accurate, and understandable information about their services usage under their subscription plans. Subscribers may not normally track their usage of wireless services and may therefore become disturbed upon receiving invoicing for services used beyond purchased amounts. For example, with short message service (SMS) messaging, hereafter text messaging, if messages sent and received during a month or other period unexpectedly exceed a paid limit and lead to additional charges, this may result in subscriber agitation. Subscribers disturbed by unexpected overlimit billing present risks of nonpayment and subscription nonrenewal, costly events for the telecommunications service provider. The application tracks services usage, provides alerts, and enables avoidance of subscriber disturbance arising from unexpected overlimit charges.

The application additionally may receive full rating information about the user's subscription plan and tracks and stores the plan information and wireless service usage counts locally on the portable electronic device. The application also stores information about available features or services of the current plan that the subscriber may have originally opted out of but may subsequently need. If the subscriber should later wish to add any of these opted out features to his or her group of currently available wireless services, the application may execute this transaction locally without immediately contacting the provider. The application additionally allows the user to completely delete information about one subscription plan and replace it with information about an entirely new subscription plan, subject to subscription terms. The application also synchronizes its counts of the subscriber's usage with counts similarly maintained by provider network components.

The present disclosure does not teach the alteration of wireless subscription plans or changing of the basic device provisioning process. The wireless services themselves are still provided by the telecommunications service provider in the same manner as for devices not executing the application. Rather, the application provided herein executes on the device, tracks services usage, and locally provides information and assistance about the status of subscribed services and availability of additional services. The application may communicate with components of the telecommunications service provider to corroborate and correct usage counts maintained locally by the application with usage counts maintained by the provider components, for example periodically, as threshold percentages of usage are exceeded, or on another basis. By regularly communicating with the subscriber and potentially anticipating problems as well as the subscriber's needs, the components provided herein promote a better overall customer experience.

Turning now to FIG. 1, a system 100 is provided The system 100 comprises a portable electronic device 110, a monitoring application 120, a provider server 130, a services database 140, service descriptions 142, 144, 146, an accounts database 150, account descriptions 152, 154, 156, subscription files 160, 162, 164, a base transceiver station (BTS) 170, and a network 180.

The monitoring application 120 executes on the portable electronic device 110. Portable electronic devices 110 are described in detail hereinafter. The monitoring application 120 receives at least one subscription file 160 from the provider server 130 of the telecommunications service provider. The subscription file 160 contains a description of voice, data, and other wireless services available under a subscription plan the user of the portable electronic device 110 has contracted for with the telecommunications service provider. The monitoring application 120 installs the subscription file 160 in the memory of the portable electronic device 110. The monitoring application 120 tracks usage of services by the portable electronic device 110 provided under the subscription plan and as documented in the installed subscription file 160. The monitoring application 120 may provide notifications to the user when usage of a service under the subscription plan is approaching or has reached a paid limit wherein usage beyond the limit may result in additional charges to the user. This paid limit may be referred to in some contexts as a usage limit. This may prompt the user to use a different available wireless service under the subscription plan or purchase additional units of the service approaching or at its paid usage limit. This may circumvent subscriber distress associated with subsequently receiving unexpected charges for overlimit usage.

The installation of the subscription file 160 and the actions of the monitoring application 120 promote the portable electronic device 110 to be aware of the contracted services available under the current subscription plan, whether the subscription plan is a prepaid, a postpaid, or another type of subscription plan. The monitoring application 120 monitors and counts usage of services and provides various notifications and alerts regarding the remaining available paid services. The notifications and alerts may be configurable by the subscriber. While the subscriber may contract for only some services available under the subscription plan, the subscription file 160 associated with the subscription plan contains information about additional services available, but not presently contracted for, under the subscription plan. Should the subscriber become interested in or need the additional services under the subscription plan, the information about the services and their cost is available locally on the portable electronic device 110 for the subscriber to review, contract for, and receive, subject to later confirmation with the telecommunications service provider.

The monitoring application 120 provides the rating and service information and allows the subscriber to contract for and receive the additional available services without concurrently making contact with the provider server 130 to complete fulfillment. The present disclosure teaches the limited empowerment of the monitoring application 120 to locally promote and grant access to some additional services available under the current subscription plan without immediately contacting the provider server 130 for confirmation and provisioning. The subscription plan as documented in the downloaded and installed subscription file 160 contains ratings and other information for most or all services available under the subscription plan, even those not originally selected. The subscription file 160 contains a full menu of wireless services and other goods that the subscriber may purchase under their current subscription plan. All rates under a rating plan associated with the subscription plan are sent in the subscription file 160 to the portable electronic device 110, whether those rates presently apply to the subscriber or not.

In addition to notifying the subscriber when usage of a wireless service is at or near its paid limit and suggesting alternate wireless services, the monitoring application 120 also learns of patterns and habits of the subscriber's usage and may provide earlier or later notifications based on projections forward from these observations. The monitoring application 120 may modify its notifications based on observed and analyzed patterns of previous actions by the subscriber in response to notifications and other events. The monitoring application 120 also may provide notifications advising the customer of amounts of unused units of wireless services still available that may expire at the end of the current usage period. This information may otherwise be cumbersome and time-consuming for the subscriber to determine, possibly involving accessing an online site of the telecommunications service provider or phoning the telecommunications service provider, both actions involving cost to the telecommunications service provider. The monitoring application 120 provides notifications when a subscriber's actions, such as placing a voice call that will incur roaming charges, may cause the subscriber's monthly bill to be higher than expected. Alerting the subscriber in situations associated with potentially higher unexpected costs may be appreciated by subscribers and contribute to subscriber loyalty and improved subscriber retention.

The monitoring application 120 also may support the full replacement of one subscription plan by another if the subscriber chooses or upon the occurrence of another event. If the subscriber determines that changing wireless services within a first subscription plan currently in effect does not adequately meet the subscriber's needs, the subscriber may choose to fully replace the first subscription plan with a second subscription plan. Full replacement of subscription plans may involve plan cancellation and is subject to the terms and conditions of the subscription plans. The monitoring application 120 may be invoked to download and install a second subscription file 162 for the second subscription plan. This action may partially or completely overwrite the existing first subscription file 160 but may save certain settings and usage counts, if applicable. Once the second subscription file 162 is installed, the monitoring application 120 then begins again to monitor wireless services usage and present messages with alerts and suggestions as discussed herein.

The telecommunications service provider may offer a plurality of wireless subscription plans under which services may be accessed by the portable electronic device 110. The subscription plans may be prepaid plans wherein a subscriber remits an agreed amount to the telecommunications service provider at the beginning of a period and receives a fixed quantity of wireless services or unlimited wireless services during the period, often one month in duration. At the end of the period, the subscriber typically remits the same amount for the same service arrangement during the next period. The subscription plans may be postpaid plans wherein subscribers consume services during a time period and pay for the services after the close of the time period. As with prepaid plans, the services under postpaid plans may be available in limited or unlimited quantity. When limited in quantity, such as 300 minutes of voice telephone conversation per month and/or 300 text messages per month, the subscriber may reach and then exceed the subscribed limit and additional charges may begin to apply to each minute of voice usage or text message usage.

The telecommunications service provider may discover that users that subscribe to wireless subscription plans providing fixed amounts of services react adversely when they receive invoices for services consumed in excess of the fixed amounts. Subscribers may not be consciously aware of the quantity of their paid services they have been using and may not realize when they reach and exceed their monthly limits of voice, text, or other services. It may come as an unpleasant surprise to a subscriber to receive an invoice for excess services used when the subscriber may have been unaware that the monthly limit had been exceeded. A postpaid subscriber may, for example, have a teenage child that engages in excessive text message communication and causes a monthly bill to be far higher than expected. When subscribers unknowingly exceed their contracted limits for a wireless service during a month or other time period and then receive a bill including charges for the excess usage, they may become agitated and contact the telecommunications service provider with complaints or questions. This results in additional infrastructure cost, call agent expense, and management costs incurred by the telecommunications service provider. In extreme cases, the subscriber may terminate his or her subscription or refuse to pay for services already consumed.

While the telecommunications service provider may determine that subscription accounts that routinely exceed and pay for services consumed in excess of agreed limits may be particularly profitable, it also may realize that this incremental profitability may be offset by increased costs of complaint handling and resolution. Such incremental profitability also may be more than offset by writeoffs due to subscription account payment defaults and outright loss of accounts associated with subscriber churn, turnover, or attrition. Replacement of such lost accounts, that may previously have been profitable, is associated with startup costs that may impact the overall bottom line of the telecommunications service provider for months or longer. The telecommunications service provider may after analysis discover that incremental revenue and profit associated with services sold in excess of purchased limits is offset in the long run by lost revenue and costs associated with account payment defaults and subscription account churn.

As noted, the monitoring application 120 is installed and fully executes on the portable electronic device 110, providing locally available usage counts and associated services to the subscriber. Because the monitoring application 120 executes locally, it may provide advantages over alternative embodiments that may provide similar services from remote components, for example network components provided by the telecommunications service provider. For example, if the subscriber encounters difficulty in accessing a subscribed wireless service, the information and other assistance may be available locally from the monitoring application 120. This may be of particular value if the portable electronic device 110 is encountering its own transmission or reception difficulties or if there are network problems preventing wireless communications. The subscriber and the portable electronic device 110 may, for example, be physically at a location wherein the quality of wireless signaling is not good for some reason. The subscriber may be in a remote location, for example. The monitoring application 120 may locally provide assistance or information to resolve some issue encountered by the subscriber whereas in other implementations, that assistance or information may not be available because the involvement of a network component may be needed.

The provider server 130 may be owned or controlled by the telecommunications service provider and may create the various subscription files 160, 162, 164 for distribution to portable electronic devices 110. The provider server 130 may create the subscription files 160, 162, 164 by combining service descriptions 142, 144, 146 contained in the services database 140 with account descriptions 152, 154, 156 contained in the accounts database 150. For a given subscriber and selected group of wireless services to be included in a subscription plan for the subscriber, the provider server 130 builds the subscription file 160. The subscription file 160 contains service descriptions 142, 144, 146 of services contracted for under the subscription agreement purchased by the subscriber. It describes each service and the quantity of units of the service received under the subscription, if applicable. If the service is text messaging, the units comprise text messages that may be sent or received during the monthly period, for example 300 maximum allowed text messages for a given month. If the service is voice telephone communication, the units may comprise minutes of voice usage, for example 300 allowed minutes per month.

The provider server 130 may build customized subscription files 160, 162, 164 for each subscriber upon receiving a subscription order. The provider server 130 may alternatively create and retain templates for subscription files 160, 162, 164 for each variation of subscription plan that a customer may order. The provider server 130 creates the subscription file 160 from the template corresponding to the customer's choice and adds the account information identifying the subscriber into the subscription file 160. The subscription file 160 also may be specific to a model or brand of portable electronic device 110. Some models or brands of portable electronic device 110 may accommodate only prepaid or only postpaid subscription plans or may accommodate either prepaid or postpaid plans but only after hardware or firmware reconfiguration. In an embodiment, the subscription file 160 may be created using the extensible markup language (XML).

The present disclosure teaches the monitoring application 120 executing on the portable electronic device 110 receiving and installing the subscription file 160 from the provider server 130. This may occur proximate to the time the portable electronic device 110 is initially provisioned for service at time of purchase. The monitoring application 120, that may already be resident in the memory of the portable electronic device 110 when the portable electronic device 110 is provisioned, may receive and install the subscription file 160 from the provider server 130 as part of the provisioning process. The subscription file 160 may be electronically pushed to the portable electronic device 110 by the telecommunications services provider using the device management (DM) protocol specified by the Open Mobile Alliance (OMA). The subscription file 160 is transmitted wirelessly or using a wired connection by the provider server 130 to the portable electronic device 110 and may be compressed and encrypted for transmission.

The monitoring application 120 receives, uncompresses, and stores individual electronic files comprising the subscription file 160. The monitoring application 120 creates a directory structure in the memory of the portable electronic device 110 to store the individual files associated with the different wireless services provided by the subscription plan purchased by the subscriber. Individual directories may be created to store files associated with the various wireless services including voice messaging, text messaging multimedia messaging, web browsing, and other applications included in the subscription plan. The files may provide counters used by the monitoring application 120 to track usage of the services and present alerts containing warnings about the subscriber approaching or reaching purchased limits of some wireless services. The files may contain subscription plan information that supports the monitoring application 120 in detecting when the subscriber is nearing a paid limit of one wireless service, for example text messaging. The monitoring application 120 may compare usage of two or more subscribed wireless services and may cause a notification to be presented suggesting that the subscriber transmit a contemplated message using a different wireless service than the wireless service initially selected for use. The monitoring application 120 detects established patterns of usage of wireless services that may not efficiently use the wireless services and develop suggestions that the monitoring application 120 presents to the user.

While the discussion herein has been oriented to the monitoring application 120 tracking usage of a plurality of wireless services provided under subscription, in an embodiment, the present disclosure teaches the monitoring application 120 tracking usage of only a single wireless service provided under subscription. While a user of the portable electronic device 110 may receive a plurality of wireless services under his or her subscription plan, the user may configure the monitoring application 120 to track usage of only one of the wireless services and disregard the other wireless services. For example, the monitoring application 120 may be configured to track usage of text messaging only by the subscriber or other users of the portable electronic device and not track usage of voice communication services or data services such as accessing of web sites.

The monitoring application 120 and the subscription file 160 processed by the monitoring application 120 on the portable electronic device 110 do not provide the wireless services covered by the subscription plan selected by the subscriber. The wireless services are provided by components of the telecommunications service provider and others parties. The monitoring application 120 and the subscription file 160 together provide the functionality described herein of maintaining awareness of the subscriber's current subscription plan, the wireless services used thereunder, and the availability of additional wireless services and other services currently not subscribed for under the current subscription plan should the subscriber later need or want them.

The individual files provided within the subscription file 160 may enable functionality for the monitoring application 120 to interact wirelessly with the provider server 130 or other servers or components of the telecommunications service provider. This may include the monitoring application 120 confirming subscription changes with the provider server 130 on an after-the-fact basis after the subscription changes have been implemented locally by the monitoring application 120. The present disclosure teaches moving a significant portion of the subscriber-servicing functionality that may have previously resided on the provider server 130 or other network-based component of the telecommunications service provider to the portable electronic device 110. When subscriber needs for information and service can be fulfilled locally, the experience for the subscriber may be more seamless and expedient in terms of not waiting for a network connection to be made to receive answers to questions and fulfillment of new service requests. The monitoring application 120 causes the portable electronic device 110 to be aware of the current subscription plan, track usage of currently subscribed services, and provide usage-related notifications that may be actionable by the subscriber. The monitoring application 120, based on the contents of the subscription file 160, contains and communicates ratings for other services not currently subscribed but available under the current subscription plan if the subscriber should desire them.

The monitoring application 120 does not necessarily explicitly alter or otherwise affect the functionality of wireless services provided under subscription plans. The wireless services may function in the same manner whether the monitoring application 120 is installed and executing on the portable electronic device 110 or not. The monitoring application 120 provides a local services usage monitoring and reporting function and thereby enhances the customer experience while removing burden from the network of the telecommunications service provider. The system 100 drives value to the subscriber by making some elements of subscriber account management functionality local and thereby more accessible to the user.

The present disclosure teaches explicitly informing subscribers when they are going to incur overages above what they have agreed to pay. With postpaid subscription plans, a subscriber may receive, for example, a fixed number of text messages and a fixed number of minutes of voice communication per month. During a month, the subscriber may, for a certain post-billed amount, send or receive 300 text messages and engage in 300 minutes of voice communication. If, during the month, the subscriber in this example exceeds the 300 text messages or exceeds the 300 minutes of voice communication, the telecommunications service provider begins accruing charges for each text message and minute of voice communication over the subscribed limits. The usage in excess of these subscribed limits may be referred to as "casual usage."

The present disclosure teaches tracking usage of wireless services under subscription and notifying subscribers when their usage approaches their paid limits wherein further usage beyond those limits is casual usage and results in incremental charges. In an embodiment, the monitoring application 120 monitors services usage and may present a daily message when usage of text messaging, for example, has exceeded a predetermined threshold. The predetermined threshold may be configured to fall between 50% and 90%, for example, of the 300 minutes paid maximums for text messaging and voice communication. Beyond the 90% usage threshold, the monitoring application 120 may provide a notification with each use of the wireless service and may provide a specialized notification upon the use of the final paid message wherein all subsequent usages are casual usages and therefore individually chargeable. The notifications may be provided by the portable electronic device 110 in visual, audible, or vibratory manners. In an embodiment, the monitoring application 120 may cause a notification to be transmitted in an electronic mail message sent to the subscriber that the subscriber may read on a desktop computer (not shown) or other device.

In an embodiment, the monitoring application 120 may cause a notification to be transmitted in a text message sent to the portable electronic device 110 associated with the wireless services consumption or to a different portable electronic device 110. For example, a teenager, a parent, and other family members may subscribe for wireless services under a family plan wherein collective usage is measured and subject to limitations. Unbeknownst to the parent, the teenager may excessively use text messaging services and persistently reach or exceed a paid limit for text messaging services for a monthly period. The monitoring application 120 may be configured to send a text message to the portable electronic device 110 used by the parent when the text messaging usage on the portable electronic device 110 used by the teenager is reaching or exceeding a paid limit as described herein. While tracking usage of wireless services, the monitoring application 120 may on a daily, weekly, or monthly basis notify subscribers of their remaining paid units of usage of various services.

The monitoring application 120 also may present recommendations for alternative services usage when the subscriber may be nearing a paid limit. When the monitoring application 120 detects that the subscriber has exceeded a predetermined threshold and is at risk of exceeding a paid limit, the monitoring application 120 may suggest the use of an alternative wireless service wherein more unused service capacity may be available. For example, a subscriber on a postpaid subscription plan may send or receive 300 text messages and engage in 300 minutes of voice communication per month for a certain amount, to be billed after the close of the month. The monitoring application 120 may be configured to track usage of both. When usage of one of either the text service or voice service exceeds a predetermined limit, the monitoring application 120 examines the available quantity of the other service. If there is paid availability still remaining for the other service, the application may present a suggestion that the customer send a contemplated message using the other service, thus avoiding a risk of incurring additional charges from casual usage.

While the discussion of the present disclosure to this point has been focused primarily on messaging, for example text messaging and voice communication, other wireless services provided by a subscription plan may be monitored by the monitoring application 120. A subscription plan may provide Internet browsing capability through a web browser installed on the portable electronic device 110. The subscription may provide for a predetermined amount of time, for example minutes or hours, that the subscriber may browse Internet sites. The subscription may additionally or alternatively provide a predetermined quantity of storage space on a server or other device that the subscriber may use to store electronic content. The monitoring application 120 may track the amount of Internet usage time logged and/or the amount of storage space used and provide notifications to the subscriber when predetermined thresholds are reached beyond which the subscriber risks incurring additional charges.

Once the monitoring application 120 receives and installs the subscription file 160 on the portable electronic device 110 and begins tracking and reporting services usage as described herein, the monitoring application 120 may receive subsequent transmissions from the provider server 130 containing updates to the subscription plan. Subscription plans may be frequently changed by the telecommunications service provider with features added, removed, or modified and rates changed. The subscriber may contract for only a portion of services offered by the subscription plan but, as noted, the subscription file 160 may contain rating information for other services included in the subscription plan that the subscriber may not have initially chosen. The monitoring application 120 receives updates to the subscription plan in effect from the provider server 130, whether the updates concern the services presently contracted for under the subscription plan or not.

The present disclosure also teaches the monitoring application 120 receiving and installing a second subscription file 162 for a second subscription plan to at least partially replace a first subscription file 160 previously received and installed documenting a first subscription plan. The subscriber may decide after using wireless services under the first subscription plan that he or she prefers a different set of wireless services under a different subscription plan. The monitoring application 120 may, upon instruction from the user and confirmation by the provider server 130, receive and install the second subscription file 162. This process may overwrite some or all of the files installed from the first subscription file 160 when the portable electronic device 110 may have been provisioned and newly received by the subscriber. In an embodiment, the monitoring application 120 may retain some usage information and stored messaging associated with the replaced first subscription file 160, such as counts of some services used. Full replacement of the first subscription file 160 by the second subscription file 162 associated with a change in subscription plan may involve cancellation of the first subscription plan. Cancellation of the first subscription plan is subject to the normal terms and conditions of the first subscription plan. The existence and functionality of the monitoring application 120 may be unrelated to the terms and conditions of the first or any other subscription plan.

As noted, the monitoring application 120 maintains counts of usage of wireless services and presents notifications to the subscriber when counts of some wireless services reach usage thresholds or paid limits. Components of the telecommunications service provider also maintain such counts. In some cases, a usage count maintained by the monitoring application 120 may differ from a usage count maintained by the telecommunications service provider. This may occur because the portable electronic device 110 and components of the telecommunications service provider are not in constant communication. The present disclosure teaches that the monitoring application 120 and the components of the telecommunications service provider that maintain usage counts may periodically communicate and synchronize their counts of wireless services used by the subscriber. In the event that a discrepancy occurs, the monitoring application 120 and the telecommunications service provider resolve the discrepancy. In an embodiment, usage counts maintained by the telecommunications service provider are authoritative and this may be documented in the subscription plan agreed to by the subscriber.

The portable electronic device 110 is a mobile telephone, a media player, or a personal digital assistant (PDA). While FIG. 1 depicts only one portable electronic device 110, it is understood that a plurality of portable electronic devices 110 are existent and active in the system 100.

The provider server 130 is a computer system. Computer systems are described in detail hereinafter. The provider server 130 is associated with the services database 140 and the accounts database 150. The provider server 130 creates the subscription files 160, 162, 164 that are pushed to the portable electronic device 110 for installation and use by the monitoring application 120 as taught herein. The provider server 130 draws account descriptions 152, 154, 156 from the accounts database 150 that describe the subscribers and their subscription plans chosen. The provider server 130 draws service descriptions 142, 144, 146 from the services database 140 and combines this information with the appropriate account description 152, 154, 156 to create the subscription file 160 for the portable electronic device 110. The subscription file 160 may be customized for a particular subscriber or may be created from a template as previously discussed. While the provider server 130 is described herein as the only computing component associated with the telecommunications service provider, many of the other functions of the telecommunications service provider attributed to the provider server 130 may in fact be performed by other computers or other components owned, operated, or contracted for by the telecommunications service provider.

FIG. 1 depicts the subscription file 160 as a component of the portable electronic device 110 and depicts the subscription files 162, 164 as components of the provider server 130 for discussion and illustration purposes. In an embodiment, the subscription file 160 will have been electronically pushed to the portable electronic device 110 after having been created by the provider server 130. The subscription files 162, 164 are depicted in FIG. 1 as components of the provider server 130 because they are effectively "waiting" there to be wirelessly transmitted to the portable electronic device 110 to replace the subscription file 160 upon subscriber choice or transmitted to a different portable electronic device 110 as part of an initial provisioning or replacement action.

The base transceiver station 170 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices. While FIG. 1 depicts only one base transceiver station 170, in an embodiment a plurality of base transceiver stations 170 may be existent and in operation.

The network 180 promotes communication between the components of the system 100. The network 180 may be any communication network including a public data network (PDN), a public switched telephone network (PSTN), a private network, and/or a combination thereof.

Figure 2:
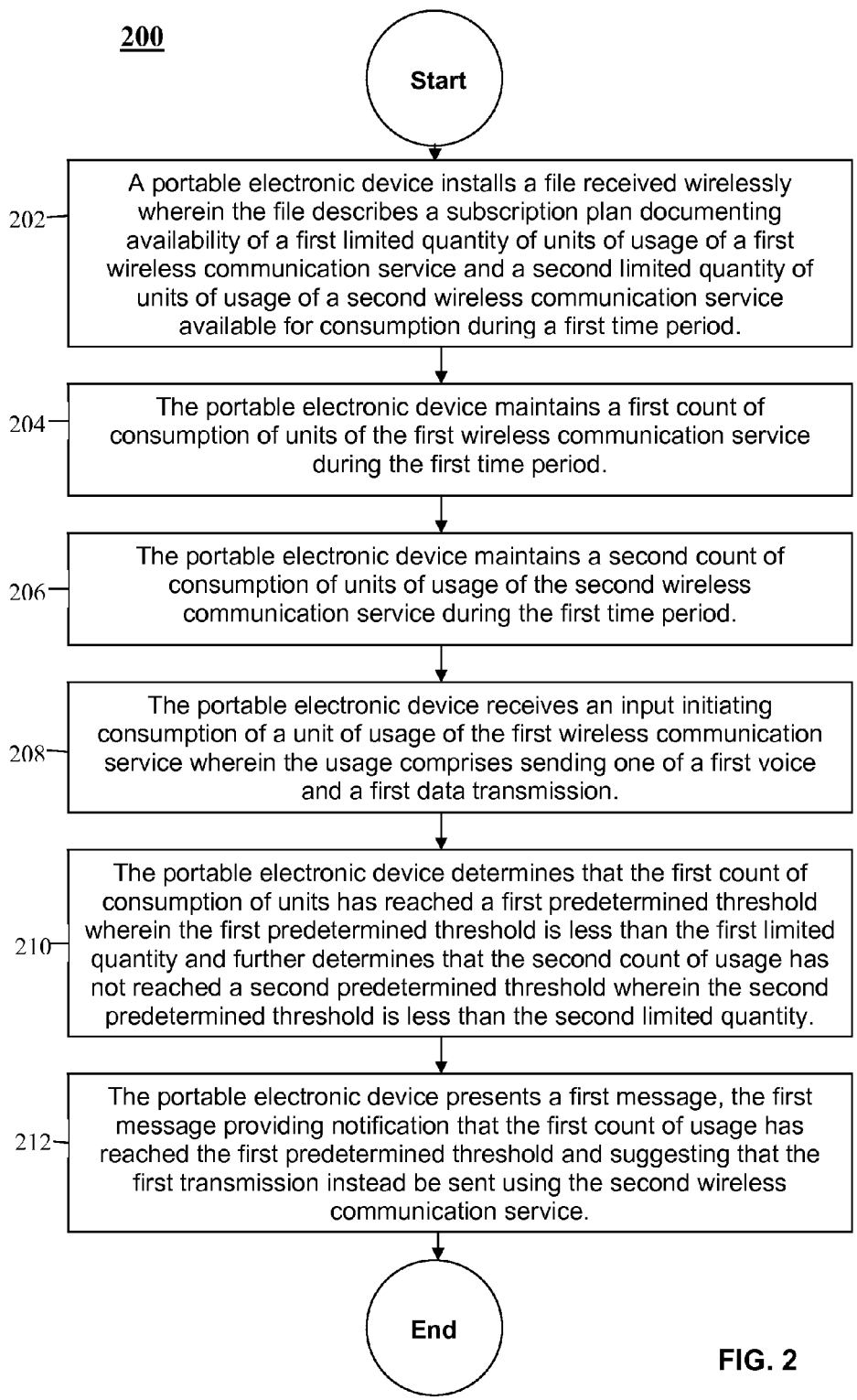
FIG. 2 is a flow chart illustrating a method according to an embodiment of the disclosure.

Turning now to FIG. 2, a processor-implemented method 200 is described. The method may be used to promote user awareness of approaching a periodic usage threshold. Beginning at block 202, a portable electronic device installs a file received wirelessly wherein the file describes a subscription plan documenting availability of a first limited quantity of units of usage of a first wireless communication service and a second limited quantity of units of usage of a second wireless communication service available for consumption during a first time period. In some contexts, the first limited quantity of units and the second limited quantity of units may be referred to as usage limits. At block 204, the portable electronic device maintains a first count of consumption of units of the first wireless communication service during the first time period.

At block 206, the portable electronic device maintains a second count of consumption of units of usage of the second wireless communication service during the first time period. At block 208, the portable electronic device receives an input initiating consumption of a unit of usage of the first wireless communication service wherein the usage comprises sending one of a first voice and a first data transmission.

At block 210, the portable electronic device determines that the first count of consumption of units has reached a first predetermined threshold wherein the first predetermined threshold is less than the first limited quantity and further determines that the second count of usage has not reached a second predetermined threshold wherein the second predetermined threshold is less than the second limited quantity. At block 212, the portable electronic device presents a first message, the first message providing notification that the first count of usage has reached the first predetermined threshold and suggesting that the first transmission instead be sent using the second wireless communication service.

Figure 3:
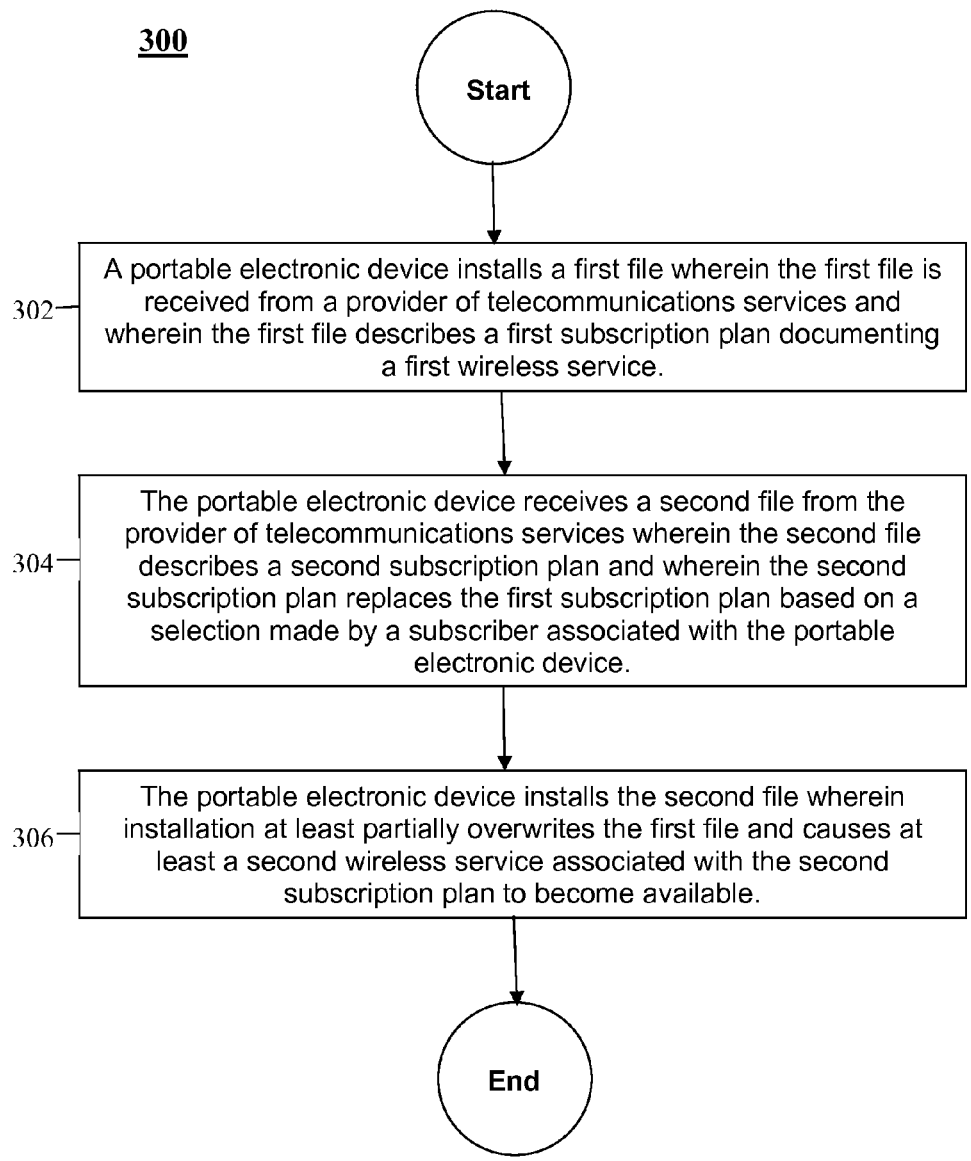
FIG. 3 is a flow chart illustrating a method according to an embodiment of the disclosure.

Turning now to FIG. 3, a processor-implemented method 300 is described. Beginning at block 302, a portable electronic device installs a first file wherein the first file is received from a provider of telecommunications services and wherein the first file describes a first subscription plan documenting a first wireless service. At block 304, the portable electronic device receives a second file from the provider of telecommunications services wherein the second file describes a second subscription plan and wherein the second subscription plan replaces the first subscription plan based on a selection made by a subscriber associated with the portable electronic device. At block 306, the portable electronic device installs the second file wherein installation at least partially overwrites the first file and causes at least a second wireless service associated with the second subscription plan to become available.

Figure 4:
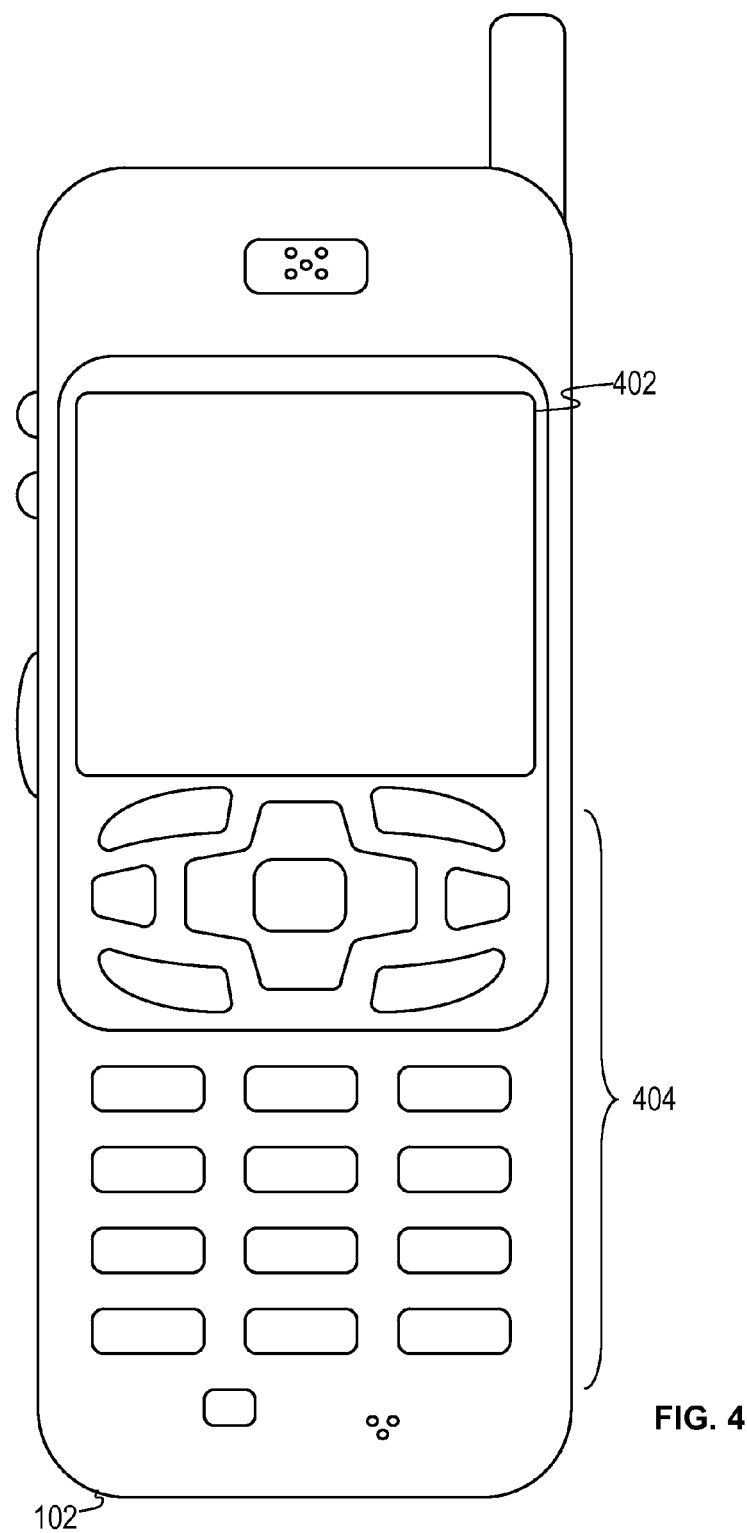
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with the base transceiver stations (BTS) 170, a wireless network access node, a peer mobile device 102 or any other wireless communication network or system. While a single base transceiver station 170 is illustrated in FIG. 1, it is understood that the wireless communication system may comprise a plurality of base transceiver stations 170. In some instances, the mobile device 102 may be in communication with multiple base transceiver stations 170 at the same time. The base transceiver stations 170 (or wireless network access node) are coupled to a wired network 180, such as the Internet. Via the wireless link and the wired network, the mobile device 102 has access to information on various servers that may provide content that may be shown on the display 402. Alternately, the mobile device 102 may access the base transceiver stations 170 through a peer mobile device 102 acting as an intermediary, in a relay type or hop type of connection.

Figure 5:
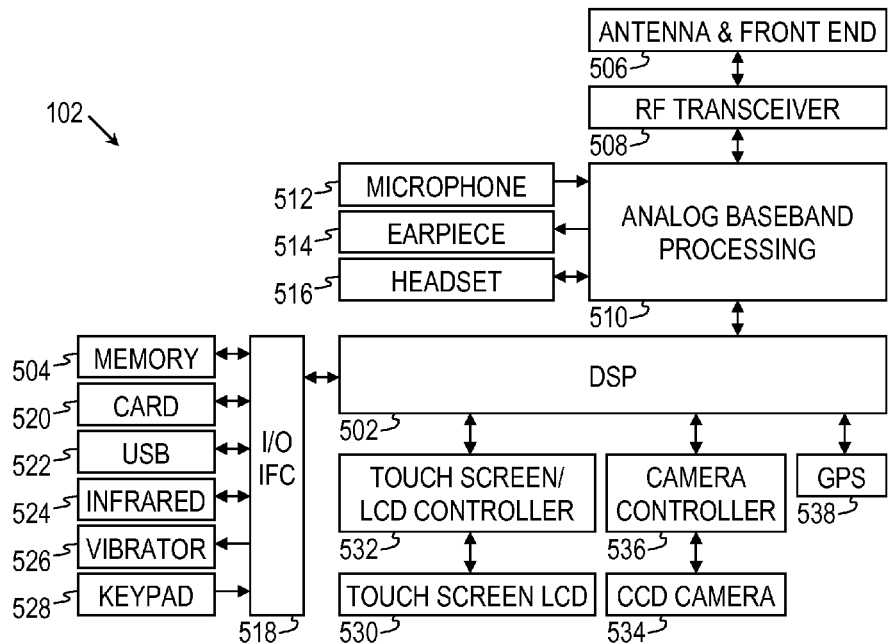
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end unit 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which also may display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 6:
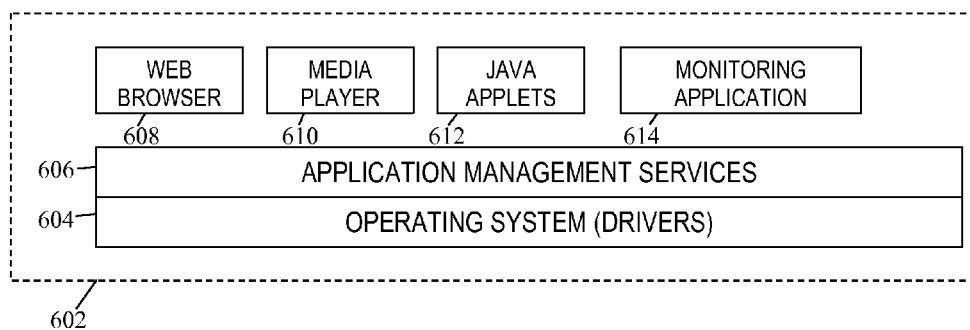
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The monitoring application 614 may correspond to the monitoring application 120 provided by the system 100.

Figure 7:
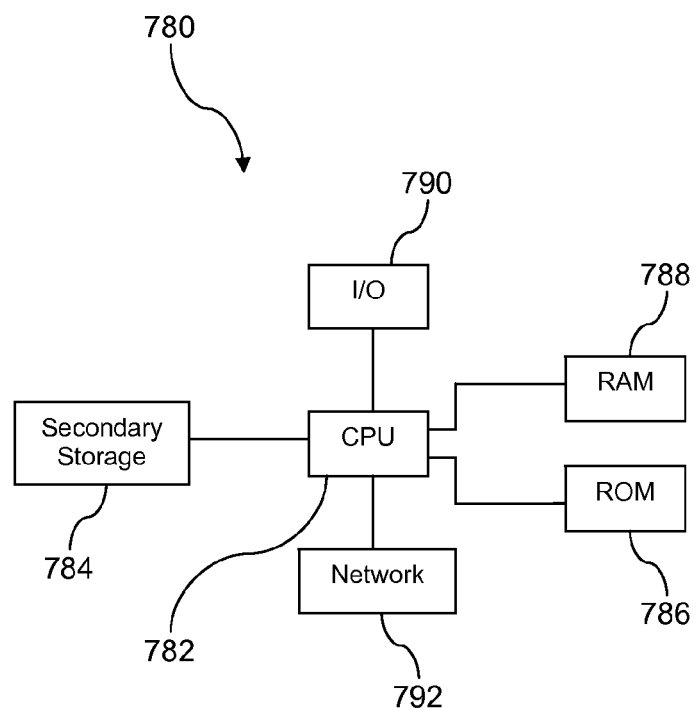
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device that promotes user awareness of approaching a usage limit, comprising:
    a processor;
    a memory; and
    an application, that, when executed by the processor,
        installs a file in the memory that describes a subscription plan documenting availability of at least one of wireless voice services or data services, wherein the subscription plan is associated with a telecommunications service provider and comprises a usage limit, and wherein the file documenting the subscription plan presently under contract additionally comprises at least one of the subscription plan or pricing information for products or features available under the subscription plan but not presently contracted for under the subscription plan,
        records a usage of a unit of a service provided under the subscription plan,
        increments a count of units of usage of the service during a usage period based on the record of the usage,
        detects the count of units of usage reaching a predetermined threshold, wherein the predetermined threshold is less than the usage limit,
        presents a message, wherein the message provides notification of the count of units of usage reaching the predetermined threshold, and
        based on the detection that the count of units of usage has reached the predetermined threshold, locally executes a transaction to add at least one of the products or features under the subscription plan but not presently contracted for under the subscription plan based on the file without immediately contacting the telecommunications service provider.

2. The portable electronic device of claim 1, wherein the portable electronic device receives the file at one of the beginning of a contract documenting the subscription agreement and upon a change to the contract.

3. The portable electronic device of claim 1, wherein the predetermined threshold is in the range of 50% to 90% of the maximum quantity of units of the service available during the usage period.

4. The portable electronic device of claim 1, wherein exceeding the maximum quantity of units of the service available during the usage period results in additional charges to a subscriber under the subscription plan.

5. The portable electronic device of claim 1, wherein the application presents another message when the count of units of usage reaches the maximum quantity of units of the service available during the usage period.

6. The portable electronic device of claim 5, wherein the application presenting the message and the other message comprises emitting one of a visible, auditory, and vibratory alert.

7. The portable electronic device of claim 1, wherein the data services comprise at least one of short message service (SMS) messaging, multimedia messaging service (MMS) messaging, electronic mail services, or Internet access services.

8. The portable electronic device of claim 1, wherein the application is further configured to learn patterns and habits of usage of the portable electronic device and provides a notification based on the learned patterns and habits.

* * * * *